Dec. 11, 1962  H. GALMAN  3,068,410
EXPANDED SCALE ELECTRICAL MEASURING SYSTEM
HAVING HIGH TEMPERATURE STABILITY
Filed Aug. 22, 1960

OUTPUT OF RECTIFIER

VOLTAGE ACROSS DIODE (WITHOUT FILTERING)

HERBERT GALMAN
INVENTOR.

BY Fraser and Bogucki
ATTORNEYS

United States Patent Office 3,068,410
Patented Dec. 11, 1962

3,068,410
EXPANDED SCALE ELECTRICAL MEASURING SYSTEM HAVING HIGH TEMPERATURE STABILITY
Herbert Galman, 1612 N. Altadena Drive, Pasadena, Calif.
Filed Aug. 22, 1960, Ser. No. 51,076
5 Claims. (Cl. 324—131)

This invention relates to electrical measuring systems and more particularly to a measuring system for indicating with a high degree of accuracy the value of an electrical quantity on an expanded scale throughout a wide range of operating temperatures. This application is a continuation-in-part of the prior copending application Serial Number 702,877, filed December 16, 1957, now abandoned.

In measuring electrical voltages and currents, conventional meters are arranged to displace an indicator along a scale by an amount which is a function of the value of the quantity being measured. Ordinarily, the meter indicator travels from a zero position which corresponds to an absence of the quantity being measured to a maximum position as the value increases. The sensitivity of such a meter may be defined in terms of the displacement of the indicator from zero position for a given value of the quantity being measured.

In many instances, an electrical quantity to be measured does not vary from zero to a maximum but is restricted within certain finite limits. In such instances, the use of a conventional zero to full scale meter to measure the quantity results in a movement of the indicator of the meter over only a portion of the scale as the quantity being measured varies. The result is that the sensitivity of the meter in measuring the electrical quantity within the range of variation is reduced.

Where the amplitude of an alternating current or voltage is to be measured and the range of variation in amplitude is restricted within finite limits, the problem of providing a meter having high sensitivity is particularly difficult. In addition, with alternating current measuring devices, it has been difficult to maintain accurate measurements over a wide range of operating temperatures.

Accordingly, it is one object of the present invention to provide a new and improved expanded scale measuring system.

It is an additional object of the present invention to provide a new and improved device for measuring an alternating current wave having an amplitude which varies within predetermined limits.

It is still another object of the present invention to provide an expanded scale voltmeter which accurately measures the amplitude of an alternating current wave when operated over a wide range of temperatures.

Briefly, the measuring device of the invention includes an indicator and a zero suppression circuit which cooperates with the indicator to allow the indicator to measure a quantity within predetermined limits only. In a particular embodiment, an alternating current expanded scale voltmeter is provided in which an alternating current wave is applied to an attenuator, a rectifier is connected to the attenuator, a filter is connected to the rectifier across which appears a unidirectional voltage having a magnitude corresponding to the average amplitude of the alternating current wave, an electrical bridge is connected to the rectifier including at least one resistance which varies as a function of the current passing therethrough within a region of negligible temperature coefficient, and an indicator is connected across the bridge for measuring the extent to which the bridge departs from a state of balance so that the indicator functions as an expanded scale meter with respect to the alternating current wave. The attenuator and filter serve to maintain the current through the current-dependent resistance within the region of negligible temperature coefficient over the expanded scale range of the indicator, thus insuring the temperature stability of the measuring device.

A better understanding of the present invention may be had from a reading of the following detailed description and an inspection of the drawing, in which.

Figure 1:
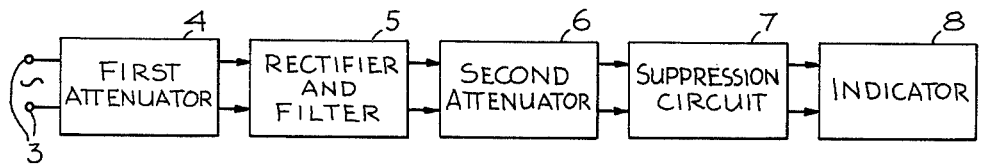
FIG. 1 is a block diagram of an electrical measuring device in accordance with the invention.

In the apparatus of FIG. 1, an alternating current wave to be measured is applied to the input terminals 3. A first attenuator 4 connected to the input terminals 3 functions to bring the input voltage within the range of the measuring apparatus as a whole. Accordingly, the first attenuator 4 is capable of passing a predetermined fractional part of the input voltage. For improved temperature stability of the measuring apparatus, the attenuator 4 is constructed of materials having a resistance which is independent of temperature, thus minimizing the effect of changes in temperature on the apparatus as a whole. In addition, the attenuator may be arranged to suppress selected frequency components of an alternating current wave, if desired. For example, the fundamental frequency component only may be passed by the attenuator with unwanted harmonic frequency components being attenuated. Examples of suitable attenuators which may or may not be temperature compensated are transformers, resistors, inductors, capacitors, or complex networks consisting of combinations of resistors, capacitors and inductors.

The voltage passed by the first attenuator 4 is applied to a rectifier and filter 5 which converts an alternating current input wave applied to the terminals 3 into a substantially unidirectional voltage having a magnitude which accurately represents a function of the amplitude of the alternating current wave applied to the terminals 3. As is discussed in greater detail below with reference to FIG. 2, this unidirectional voltage is maintained above a predetermined value during operation of the measuring apparatus so that the suppression circuit operates within its region of substantial independence from temperature variations.

The output of the rectifier and filter 5 is applied to a second attenuator 6 which functions to pass a predetermined fractional part of the unidirectional voltage. Since only substantially unidirectional voltages are involved, the second attenuator 6 will ordinarily comprise elements such as resistors which are capable of functioning with unidirectional voltages and relatively low frequency signals.

The unidirectional voltage from the second attenuator 6 is applied to a suppression circuit 7 which subtracts a constant value from the input voltage to produce an output voltage or current which is a function of the input. The suppression circuit 7 is arranged to produce a zero output signal for some predetermined value of input voltage. For example, with a linear relationship between the input voltage and an output current over the operating range of the apparatus, the function of the apparatus of FIG. 1 is in accordance with the following equation:

$$I = K(E_{in} - X)$$

where I equals the output current from the suppression circuit, K equals a constant, $E_{in}$ equals the input voltage and X equals the value of the input voltage at which the output current equals zero. Thus, for an input voltage equal to X, the current is zero, and an indicator 8 registers at the conventional zero position of its scale which may be marked with a value corresponding to X volts. The constant K is adjusted to produce a full scale deflection of the indicator 8 at the upper limit of the range of variation of the input voltage so as to obtain a maximum sensitivity of the indicator 8 with variation in input voltage. For example, if the indicator 8 is a one milliampere meter and the apparatus as a whole is designed to measure voltages between 105 and 125 volts, X in the suppression circuit 7 equals 105 volts and K equals five times $10^{-5}$. By marking one end of the scale of the indicator 8, 105 volts, and the other end of the scale of the indicator 8, 125 volts, the apparatus has a maximum sensitivity over the range of the input voltage. Between 105 and 125 volts, the scale of the indicator 8 may be calibrated so as to provide an accurate measurement of any voltage falling within the two outside limits.

The indicator 8 may be a conventional direct current indicating electric meter such as an ammeter or voltmeter. It may be arranged so that the indicating pointer is at the left hand end, the center, the right hand end, or any other point of the scale which is chosen for zero input. Since the sensitivity of an indicating meter varies somewhat with temperature, the zero input signal point has a higher stability than any other point on the scale. Accordingly, it may be desirable to establish the zero signal point at the most significant voltage. In addition, the indicator 8 may contain temperature correcting elements to minimize the change in sensitivity with temperature. For example, a thermistor in parallel with a fixed resistor may be used in series with the meter movement to reduce sensitivity change with temperature.

Where a permanent record of the input voltage applied to the terminals 3 is desired, the indicator 8 may comprise a recorder which produces a record as a function of time or other variable parameter.

Figure 2:
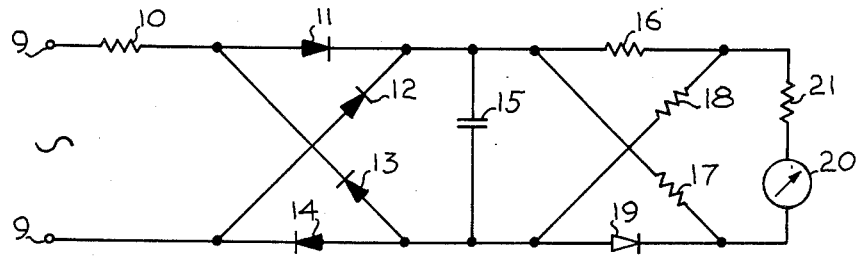
FIG. 2 is a schematic circuit diagram of a particular embodiment of the invention for measuring alternating current waves.

FIG. 2 shows an exemplary embodiment of the invention based upon the foregoing principles. In FIG. 2, alternating current waves applied to the terminals 9 are passed by a resistor 10, which functions in combination with the input resistance of a bridge rectifier including the diodes 11, 12, 13 and 14, to form a voltage divider or attenuator so that a predetermined fractional part of the alternating current wave from the terminals 9 is applied to the bridge rectifier. By making the resistor 10 relatively large with respect to the resistance in the forward direction of the diodes 11–14, the effect of temperature on the internal resistance of the diodes 11–14 is minimized.

A capacitor 15 connected across the output of the rectifier bridge of the diodes 11–14 operates as a low pass filter to effectively by-pass the alternating current components of the rectified voltage so that the signal appearing across the capacitor 15 is a unidirectional voltage having a magnitude which corresponds to the amplitude of the average value of the alternating current wave applied to the terminals 9. In the circuit of FIG. 2, the parameters are such that the second attenuator 6 of FIG. 1 has been omitted. Accordingly, the unidirectional voltage appearing across the capacitor 15 of FIG. 2 is applied to a suppression circuit comprising a bridge including three resistors 16, 17 and 18 and a non-linear element comprising a zener diode 19.

The back voltage of particular types of solid state diodes is such that the voltage tends to remain constant with the diode conducting more or less current so that the diode in effect functions as a non-linear resistor having a resistance values which varies as a function of current. Furthermore, the variation of resistance value with current for such a diode is dependent to a certain extent upon the temperature at which the diode is operated. This dependency, which may be expressed in terms of a temperature coefficient for the device, in turn is related to the current through the diode. For currents within a particular range which is encompassed by the constant voltage portion of the voltage-current characteristic of the diode, the temperature coefficient thereof is negligible so that, for a given current within this range, the resistance of the diode remains unchanged over a wide variation of operating temperature. The result is that in the circuit of FIG. 2 the zener diode 19, over a limited range of variation in current flow therethrough, establishes within the bridge a substantially constant voltage over a wide range of temperature variation. At a predetermined value of current flow through the zener diode 19, the voltage-current ratio is such that the resistance of the zener diode 19 balances the bridge as a whole.

A meter 20 is connected serially with a temperature compensating resistor 21 across the bridge of the resistors 16, 17 and 18 and the zener diode 19 to measure the extent of unbalance of the bridge circuit. At the point at which the current flow through the zener diode 19 balances the bridge as a whole, no current flows through the meter 20, with the result that the indicating pointer of the meter is at rest at what normally would be the zero position. However, since the condition of balance of the bridge is established when a predetermined unidirectional voltage appears across the capacitor 15, the rest position of the pointer of the meter 20 actually corresponds to a finite magnitude of unidirectional voltage across the capacitor 15 and hence, a finite amplitude of an alternating current wave applied to the terminals 9. During operation of the measuring apparatus the capacitor 15 maintains the current in the zener diode 19 above a predetermined minimum value related to the aforementioned range of negligible temperature coefficient, thus providing the desired temperature stability for the apparatus in accordance with the invention.

Figure 3:
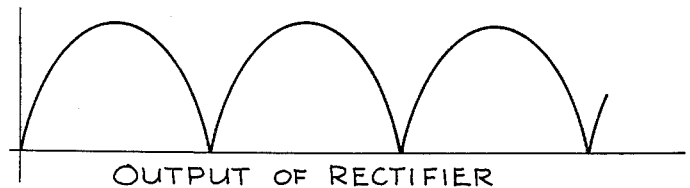
FIG. 3 depicts waveforms useful in explaining the operation of the invention.
Figure 3:
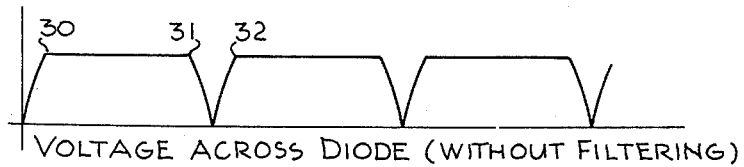

A particular advantage of combining the capacitor 15 with the zener diode 19 in the circuit of FIG. 2 may be demonstrated with reference to FIGS. 3(A) and 3(B). When an alternating current wave is applied to the terminals 9, the output of the bridge rectifier circuit of diodes 11–14 corresponds to the waveform of FIG. 3(A). The waveform of FIG. 3(B) illustrates the action of the zener diode in clipping the waveform of FIG. 3(A). Without the filter capacitor 15, the zener diode functions as a constant voltage device only between the points 30 and 31. In the range between the points 31 and 32, the diode acts as a much larger resistance and fails to provide the desired voltage regulation. Furthermore, within the region between the points 31 and 32 the zener diode temperature coefficient becomes substantial and thus, the zener diode alone fails to provide the requisite temperature stability of the associated expanded range voltmeter.

The circuit without the filter capacitor 15 is particularly critical with regard to the shape of the waveform of the voltage being measured. When a pure sine wave is applied at the terminals 9, a simple correlation may be obtained between the input signal and the output of the rectifier. However, should the waveform at the terminals 9 change, the behavior of the measuring instrument in the region where the zener diode is acting as a resistor is completely unpredictable. This destroys the constancy of any relationship between the average value of the input voltage and the rectifier output.

By employing the filter capacitor 15 at the output of the rectifier to maintain the voltage across the bridge of the resistors 16–18 and the zener diode 19 above a specified minimum value which establishes the zener diode 19 in its range of constant temperature coefficient, the above mentioned deficiencies are obviated. In accordance with the invention the filter capacitor 15 prevents the voltage across the zener diode 19 from dropping below the constant level shown between the points 30 and 31 (FIG. 3(B)) and the region between the points 31 and 32 is completely eliminated. As a consequence, the zener diode 19 operates at a current which is sufficiently constant to maintain the device within its region of negligible temperature coefficient. Moreover, since the voltage maintained across the filter capacitor 15 represents an average of the alternating signal waveform applied to the terminals 9, the desired independence of temperature variation is maintained by this arrangement of the invention even though the shape of the input waveform varies substantially.

As an example of the operation of a circuit of the invention the resistors 16, 17 and 18 are arranged so that the bridge is balanced and no current flows through the indicator 20 for a voltage at the terminals 9 corresponding to the lower limit of the scale of the indicator 20. As already mentioned, the circuit is arranged so that the filter capacitor 15 maintains a voltage sufficient to establish the zener diode 19 in its region of constant voltage regulation for this value of input voltage. As the amplitude of the alternating current wave applied to the terminals 9 increases, the unidirectional voltage appearing across the capacitor 15 increases and the bridge of the resistors 16–18 and zener diode 19 is unbalanced by an amount corresponding to the increase in the amplitude of the alternating current wave and the magnitude of the unidirectional voltage. The effect of the unbalance is registered by the meter 20 through the movement of a pointer or indicator over a scale. The upper limit of measurement of the circuit of FIG. 2 is reached when the pointer has traveled to the end of the scale.

The range of voltages which may be measured by the apparatus of FIG. 2 is a function of the values of the resistors 17 and 18. In a particular embodiment, the resistors 16 and 18 were made equal. Where the zener diode 19 is of a type which maintains a voltage of approximately 5.7 volts with variation in current flow therethrough, the bridge of the resistors 16–18 and the zener diode 19 is balanced with 11.4 volts appearing across the capacitor 15. The constant K of the mathematical equation described above may be adjusted by controlling the values of the resistors 16 and 18 until full scale indication is achieved on the meter 20 for a predetermined amplitude of alternating current wave applied to the terminals 9.

The minimum scale indication at which the bridge of the resistors 16–18 and the zener diode 19 is balanced may be adjusted by varying the value of the attenuator resistor 10 until the voltage appearing across the capacitor 15 equals 11.4 volts and the bridge is balanced.

The following circuit component values are given by way of example only, it being understood that these values are indicative of one workable embodiment:

| Component | Value |
|---|---|
| Resistor 10 | 14,000 ohms—2 watts wire wound. |
| Resistors 16 and 18 | 1,000 ohms—wire wound. |
| Resistor 17 | 2,000 ohms—wire wound. |
| Resistor 21 | 290 ohms—wire wound. |
| Diodes 11–14 | 1N67A. |
| Zener diode 19 | T1651. |
| Capacitor 15 | 20 microfarads—50 working volts. |
| Meter 20 | 400 microamperes—internal resistance 230 ohms. |

With the above circuit components the apparatus is adapted to measure alternating current waves of from 105 to 125 volts. The value of the resistor 10 was adjusted to give zero output with 105 volts input. The value of the resistor 21 was then adjusted to give full scale reading with 125 volts input.

In the particular embodiment of FIG. 2, the apparatus is arranged to measure the average value of an alternating current wave by virtue of the proper selection of the value of the filter capacitor 15. However, it is generally convenient to calibrate the scale of the meter 20 in terms of the equivalent R.M.S. (root-mean-square) values of an alternating current wave, even though the apparatus responds to the average value of the input alternating current wave.

Tests made at room temperature with both 60 and 400 cycle per second waves applied to the terminals 9 indicated that the accuracy of the meter is such that the .25% standard meter used for calibration did not indicate a significant error. The indication on the meter 20 was linear and did not change measurably throughout the test. At elevated temperatures, the zero indication increased so as to require 105.6 volts at 125° F. and 107.3 volts at 158° F.

The input power required to operate the apparatus of FIG. 2 is less than one watt, which is sufficiently small for most precision applications. The components occupy less than two cubic inches and may be built into a small self-contained meter. By changing the value of the attenuator resistance 10 by means of a switch, the meter may be operated on multiple scale ranges with equal temperature stability. If it is necessary for the circuit to draw less power, an isolating amplifier can be inserted between the input and the attenuator resistor 10.

By means of the measuring system of the invention, there is provided a simple, novel, expanded scale voltmeter for measuring alternating current waves with a high degrees of accuracy and temperature stability over a wide range of operating temperatures. The illustrative embodiments of the invention of FIGS. 1 and 2 are given as examples only of one way in which the invention may be used to advantage. Accordingly, the invention should not be limited to the particular structure set forth herein, but should be given the full benefit of any and all equivalent arrangements falling within the scope of the annexed claims.

What is claimed is:

1. A measuring system for alternating current waves including the combination of a pair of input terminals, an attenuator connected to the input terminals, a rectifier connected to the attenuator, a filter connected to the rectifier to provide a unidirectional voltage having a magnitude corresponding to the average amplitude of a rectified alternating current wave applied to the input terminals, a bridge circuit connected to the filter, said bridge circuit including three resistance arms having substantially constant values of resistance with varying current flow therethrough, and a fourth arm comprising a zener diode which varies in its electrical resistance as a function of current flow therethrough for values of current flow above a predetermined minimum current value and which exhibits a negligible temperature coefficient for a current range above said predetermined minimum current value, said filter being responsive to the unidirectional voltage to maintain current flow through the zener diode above said predetermined minimum current value for alternating current waves applied to said measuring system within the range of measurement of said system, said resistance arms being selected such that the bridge is electrically balanced for a predetermined unidirectional voltage from the rectifier and electrically unbalanced for voltages other than said predetermined unidirectional voltage, and an indicator connected across the bridge for indicating the extent of the voltage unbalance of the bridge whereby the indicator functions as an expanded scale voltmeter with respect to alternating current applied to the input terminals.

2. A measuring system for measuring electrical quantities within a range of values including the combination of a pair of input terminals for receiving an alternating current wave to be measured, means coupled to the input terminals for developing a unidirectional voltage having a magnitude corresponding to the average amplitude of an alternating current wave applied to the input terminals, a suppression circuit including at least one zener diode for producing a substantially constant voltage within the suppression circuit over a wide range of ambient temperature variations and values of current flow therethrough above a predetermined minimum current value, filter means coupling said unidirectional voltage developing means to said suppression circuit for sustaining the current flow through said zener diode at a level above said predetermined minimum current value for all values of the alternating current wave within the range of operation of the system, and an indicator coupled to the suppression circuit for measuring voltages passed by the suppression circuit whereby the indicator functions on an expanded scale with respect to the amplitude of the alternating current wave applied to the input terminals.

3. A measuring system for alternating current waves including the combination of a rectifier coupled to be responsive to the alternating current waves, a filter connected to the rectifier across which appears a unidirectional voltage of a magnitude corresponding to the average amplitude of an alternating current wave applied to the rectifier, a bridge circuit coupled to the filter, the bridge circuit being arranged to be balanced for a predetermined unidirectional voltage appearing across the filter and unbalanced for other voltages, said bridge circuit including a zener diode coupled to establish a substantially constant voltage independent of ambient temperature variations within the bridge circuit over a range of values of current flow therethrough above a predetermined minimum current value, said filter being arranged to maintain current flow through said zener diode for amplitude values of alternating current waves applied to the measuring system within the range of measurement thereof at a level above said predetermined minimum current value and within said range of values at which the zener diode produces a substantially constant voltage within the bridge circuit, and an indicator coupled to the bridge circuit and responsive to the extent of the unbalance of the bridge circuit to represent the amplitude of an alternating current wave applied to the rectifier.

4. A measuring system for alternating current waves including the combination of a rectifier coupled to receive the waves, a filter connected to the rectifier for providing, in response to the rectified waves, a unidirectional voltage having a magnitude corresponding to the average amplitude of a rectified alternating current wave after application to the rectifier, the filter providing a voltage in excess of a predetermined minimum value for alternating current waves having amplitudes within the range of measurement of the system, three linear resistances having constant values of resistance for different levels of current flow therethrough, a zener diode having a value of resistance which varies as a function of the value of the current flow therethrough for values of current flow above a predetermined minimum current value and exhibiting a negligible temperature coefficient for a range of current values above said predetermined minimum current value, said predetermined minimum current value being substantially no greater than the current value resulting from voltages from the filter of the predetermined minimum value, said three linear resistances and said zener diode being connected to said filter in an electrical bridge configuration which is balanced when the ratio of the values of one linear resistance and the resistance of the zener diode equals the ratio of the values of the other two resistances, the resistance of the zener diode then being in the range of negligible temperature cofficient, and an indicator connected across the bridge for measuring the extent to which the bridge is unbalanced whereby the measuring system functions as an expanded scale meter with respect to the amplitude of an alternating current wave applied to the rectifier.

5. An expanded scale measuring system for measuring electrical quantities above a selected minimum value including the combination of a pair of input terminals for receiving an alternating current wave, means coupled to the input terminals for developing a unidirectional voltage having a magnitude corresponding to the average amplitude of an alternating current wave applied to the input terminals, a bridge circuit including at least one zener diode which varies in its electrical resistance as a function of current flow therethrough above a predetermined minimum current value and which exhibits a substantially negligible temperature coefficient for a range of currents above said predetermined minimum current value to establish a substantially constant voltage within the bridge circuit, filter means coupling said unidirectional voltage developing means to said bridge circuit, said filter means maintaining the current flow through said zener diode at a level above said predetermined minimum current value for all values of the alternating current wave within the range of operation of the system, said bridge circuit being arranged to be balanced for a predetermined value of a unidirectional voltage from the filter means and unbalanced for other voltages, and an indicator coupled to the bridge circuit and responsive to the extent of the unbalance of the bridge circuit.

References Cited in the file of this patent

UNITED STATES PATENTS

| 2,526,329 | Chamberlain | Oct. 17, 1950 |
|---|---|---|
| 2,751,549 | Chase | June 19, 1956 |
| 2,854,651 | Kircher | Sept. 30, 1958 |
| 2,954,483 | Ulrich | Sept. 27, 1960 |

FOREIGN PATENTS

| 780,118 | Great Britain | July 31, 1957 |
|---|---|---|

OTHER REFERENCES

Cornell-Dubilier Capacitor, vol. 22, No. 5, May 1957, pages 3–8.